Figure 1:
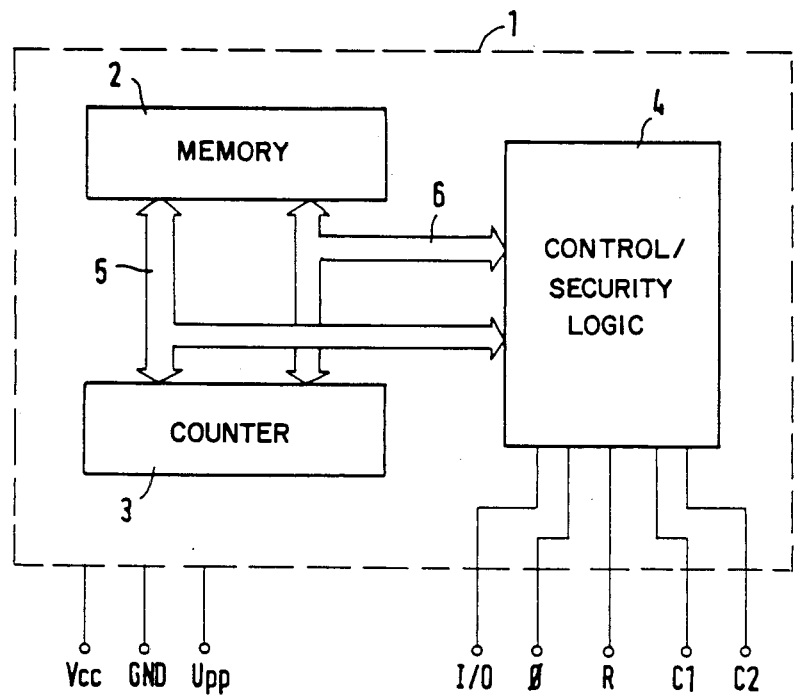

United States Patent [19]

Effing

[11] Patent Number: 4,853,526

[45] Date of Patent: Aug. 1, 1989

[54] DATA CARRIER ARRANGEMENT HAVING AN INTEGRATED CIRCUIT

[75] Inventor: Wolfgang Effing, Gilching, Fed. Rep. of Germany

[73] Assignee: GAO Gesellschaft fur Automation und Organisation mbH, Fed. Rep. of Germany

[21] Appl. No.: 113,251

[22] Filed: Oct. 26, 1987

[30] Foreign Application Priority Data

Nov. 11, 1986 [DE] Fed. Rep. of Germany ....... 3638505

[51] Int. Cl.$^4$ ............................................. G06K 19/06
[52] U.S. Cl. .................................. 235/492; 235/381; 235/441
[58] Field of Search .......................... 235/492, 441, 381

[56] References Cited

U.S. PATENT DOCUMENTS 3,934,122  1/1976  Riccitelli ........................ 235/492 X
4,498,000  2/1985  Decavele et al. ............... 235/492 X
4,717,815  1/1988  Tomer ............................. 235/492 X Primary Examiner—David L. Trafton
Attorney, Agent, or Firm—Andrus, Sceales, Starke & Sawall

[57] ABSTRACT

The present invention relates to a data carrier arrangement having an integrated circuit (1) for obtaining of services, goods or the like, the integrated circuit (1) having at least one non-volatile data memory (2) with a predetermined number of memory cells which are readable, erasable and writable. In the data carrier arrangement described, the integrated circuit (1) has along with the data memory (2) a counter (3) consisting of a plurality of stages, and a control and security logic (4), the counter (3) being operable only in one predetermined direction, the size of the data memory (2) being selected such that its memory cells are adapted to the steps of the counter, and the control and security logic (4) controlling, among other things, the data transfer between the memory (2) and the counter (3) in such a way that before each use of the data carrier the current memory value is transferred to the counter and after use of the data carrier the memory content is updated with the new counter reading.

6 Claims, 3 Drawing Sheets

≙ ERASED STATE

≙ LOADED STATE

DATA CARRIER ARRANGEMENT HAVING AN INTEGRATED CIRCUIT

The present invention relates to a data carrier arrangement having an integrated circuit for obtaining services, goods or the like, the integrated circuit having at least one non-volatile data memory with a predetermined number of memory cells which are readable, erasable and writable.

A data carrier or an electronic card of the above-mentioned type is disclosed, for example, in German "offenlegungsschrift" No. 30 29 641. The card described in the reference, which has an electronic circuit and a memory with erasable and writable memory cells, is suitable for utilization in a great variety of goods and services machines, for example telephones, drink machines, food dispensing machines, highway toll machines, etc.

The known card belongs to the category of so-called expire cards. Such a card uses a non-volatile memory consisting of a plurality of memory cells, which is erased globally but written cell by cell. Before the card is issued the memory is erased so that the initial state corresponds to the erased state. This initial state is equated with a specific money value which entitles the user to utilize goods or services. Every time the card is used the initial value is reduced by memory cells being written in accordance with the particular service utilized, until the memory is completely written. Each memory cell thus represents a specific unit of value (smallest chargeable unit) so that the total number of cells determines the total value of the card.

In order to prevent frauds from returning a used-up card to the initial state, i.e. the erased state, one line of the memory, consisting of a plurality of cells, is loaded with a key which can only be written into the memory once and is checked as to its correctness by the interrogator unit or terminal for every transaction. If a manipulator attempts to erase the memory to return it to the initial state, he thereby also erases the key since the memory can only be erased globally. Since the key cannot be loaded a second time into the memory, as mentioned above, the card is then useless. The known card seems to be sufficiently protected in terms of security, but involves the disadvantage that memories with a relatively high number of memory cells must be provided for customary use of the card.

To allow for flexible use of a card of the stated type in a great variety of areas one must ensure that the value per chargeable unit is as small as possible, on the one hand, and that the number of chargeable units, i.e. the maximum value of the card, can be set as high as possible, on the other hand. For example, if the value per unit is one cent and the maximum value of the card is $200, a memory of about 20 kBit must be made available in the known card solely to deduct these 20,000 units.

Large memories require large chip areas and are therefore expensive, as is well known. It is of crucial importance to attain a solution as inexpensive as possible, in particular for the aforesaid applications, for which the data carrier will be a mass-produced item. Integrated circuits with large dimensions must thus be avoided simply because of the expense. But they are also disadvantageous because they are known to break much more easily then circuits with smaller dimensions when incorporated into flexible cards and also during use of these cards. It is possible to implant in cards larger circuits which have a sufficient service life, but the card technology measures required are relatively elaborate and generally not acceptable for cheap cards due to the higher costs involved.

The invention is therefore based on the object of proposing a data carrier having an integrated circuit which is highly flexible in its use but has a memory as small as possible, and does not involve any disadvantages in terms of security.

This object is achieved by the features stated in the main claim.

In a preferred embodiment of the invention, the integrated circuit provided with control, data and supply lines includes a volatile counter which is operated in the known manner by a clock signal, and a non-volatile memory adapted to the size of the counter. There is also a control and security logic located on the integrated circuit for processing the signals applied to the control and data lines and controlling the data transfer between the counter and the memory in a manner to be explained below.

An example should make it clear that in the inventive solution the integrated circuit can operate with only a small memory volume in spite of a low value as the smallest chargeable unit and a relatively high initial value.

Let us assume that the counter is a 16-bit counter and the unit of value per clock pulse is one cent. In this configuration it is possible to obtain a total value of approximately $650 using a memory comprising only sixteen memory cells. The relation between the memory size and the maximum value of the card, with a low value per unit at the same time, is thus considerably improved compared to known data carriers. This substantial saving of necessary memory volume and thus of chip area considerably reduces the price of the circuit and that of the card due to the simplified production. This is not altered by the fact that a control and security logic must be provided additionally on the integrated circuit in the inventive embodiment. It has been shown that the additional effort for the logic required by the inventive solution to protect the card from manipulation is relatively little and thus barely diminishes the advantage achieved by the drastic memory reduction. Thus, although inventive data carriers can be produced much more cheaply than known data carriers, they do not involve any disadvantages in terms of security compared thereto.

The control and security logic provided on the circuit ensures, among other things, that an initialization process which cannot be influenced with intent to defraud takes place automatically before the beginning of each transaction. It involves, among other things, the residual value present in the memory, or the initial value, if the data carrier is being used for the first time, being transferred to the counter. The counter is designed in such a way that, driven by clock pulses, it can only count in the direction which reduces the value transferred from the memory. During or after the transaction the counter reading obtained is transferred to the memory, so that the memory value is also reduced by the number of units used up.

The inventive solution makes is possible to realize a data carrier having an integrated circuit which can be produced inexpensively and implanted in a data carrier over a relatively small area due to the low memory requirements. The circuit can thus be used as a mass-produced item for a great variety of applications. It is equally easy and virtually free of additional costs to allot different card values by changing the number of chargeable units per card as it is to change the value of the single chargeable unit while maintaining the same total value of the card. By extending the memory and counter by only one memory or counter position in the inventive solution, one can double the total value of the card, for example. In the known card, however, the total memory must be doubled to achieve this goal.

Figure 2:
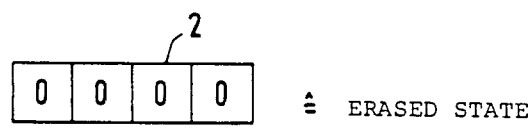
Figure 2:
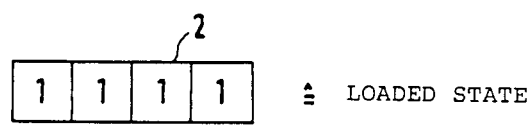
Figure 3A:
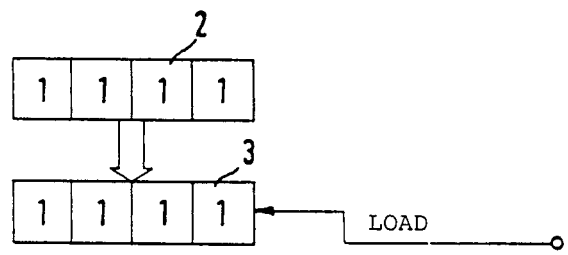
Figure 3B:
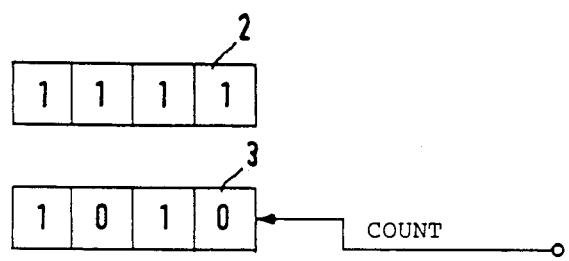
Figure 3C:
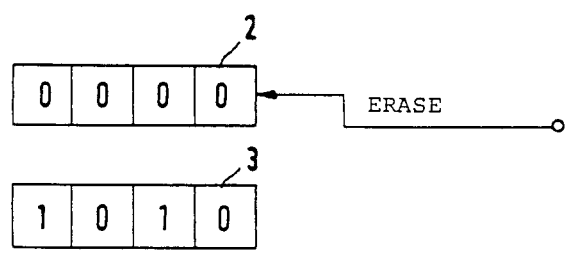
Figure 3D:
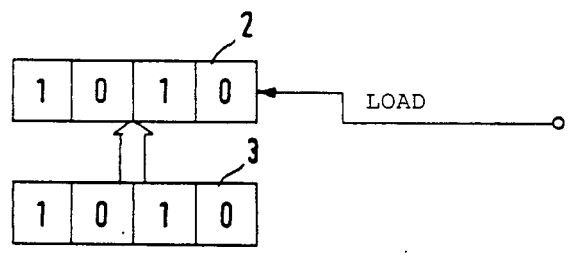
Figure 4:
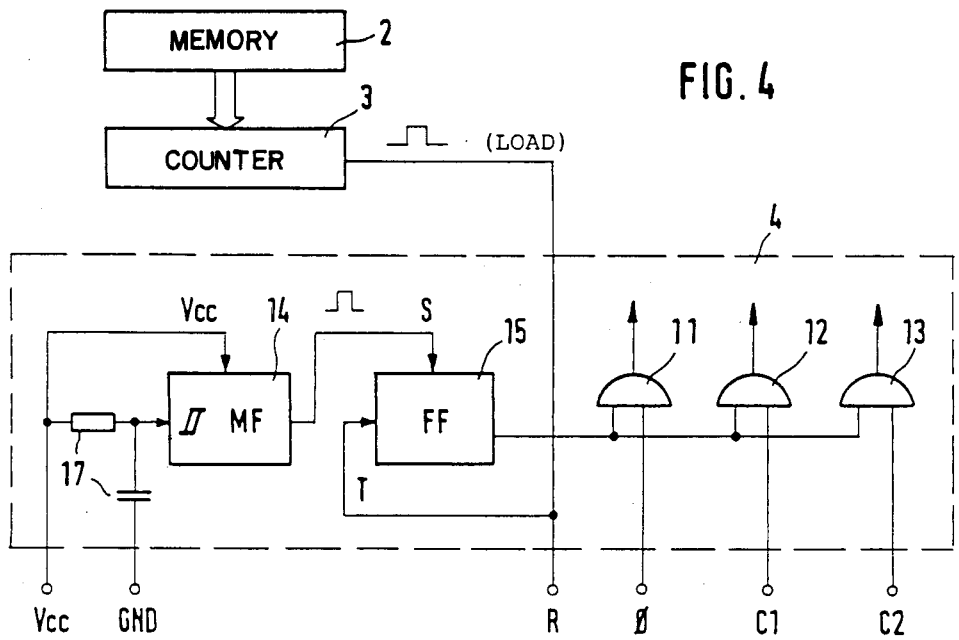
Figure 5:
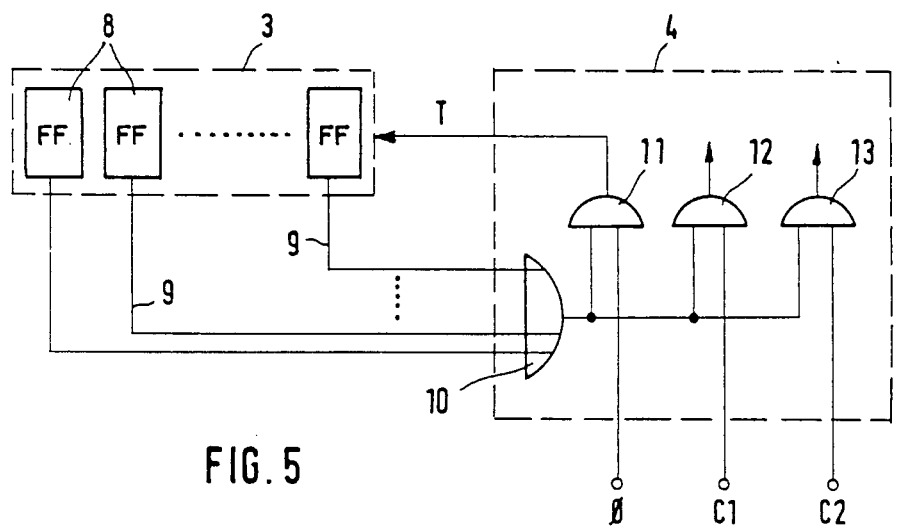

Further advantages and developments of the invention can be found in the subclaims and in the following description of embodiments with reference to the figures, in which FIG. 1 shows an exemplary embodiment of an inventive integrated circuit, FIG. 2 shows a schematic view of a memory in the erased state and in the loaded state, FIGS. 3a to 3d show the various phases during a transaction process, FIGS. 4 and 5 show detail circuits of the control and security logic shown in FIG. 1.

FIG. 1 shows an exemplary embodiment of an integrated circuit 1, showing only the elements necessary for understanding the invention, namely a memory 2, a counter 3 and a control and security logic 4.

Memory 2, which has, for example, 16 memory cells, is made in so-called $E^2PROM$ technology. These memories and non-volatile memories which are electrically erasable and writable. A memory cell of this type of memory is written by applying a charge to a so-called "island" of the cell. A memory cell is erased accordingly by removing the charge from the "island". The electrical erasing and writing are performed via separate lines.

The integrated circuit contains along with memory 2 a volatile binary counter 3 which comprises, for example, 16 bistable flipflops. The counter is constructed in such a way that the binary number made available at the outputs is reduced by one at each clock pulse.

The counter and memory are connected via a data and control bus 5, 6 with each other and with control and security logic 4 also located on the circuit. The data are parallel-processed between memory 2, counter 3 and logic 4. In control and security logic 4 a parallel-to-serial converter is provided to allow for serial communication with corresponding output devices. Control bus 5 contains the signal lines necessary for controlling the units, for example a clock line for the counter and writing, erasing and reading lines for the memory and counter. The control of these processes is commonly known, so that it need not be dealt with here.

As shown by FIG. 1, the integrated circuit has eight connections in this embodiment, a ground connection (GND), a connection for the supply voltage (Vcc) and a connection for the programming voltage (Upp) for non-volatile memory 2. A bidirectional data line (I/O), a clock line ($\phi$) for the counter, a reset line (R) and two control lines (C1, C2) are also provided. The control lines can be used to select different modes of operation, for example reading of the counter, operation of the counter or loading of the counter reading into the $E^2$-PROM. The reset line is required for every initialization process of the integrated circuit before the beginning of each transaction. Details shall be described in connection with FIG. 4.

In the embodiment shown, the above-mentioned modes of operation are controlled by the terminal, for example a telephone. During operation the signals on the lines must be protected from manipulation with intent to defraud.

The technical measures required to protect the lines are known and are already provided in the means in question here.

These protective measures may be dispensed with if the signals for the reset and control lines are not supplied externally but generated within the circuit by control and security logic 4. In particular, the initialization of the circuit to be effected before each use and the updating of the memory with the current counter reading can be controlled within the circuit. However, in this case control and security logic 4 will be accordingly more extensive.

Before details of the control and security logic are dealt with, the processes taking place during a transaction shall be explained with reference to FIGS. 2 and 3.

For the sake of simplicity let us assume a memory 2 having four memory cells and a correspondingly large counter 3. Further, the erased state of the memory shall correspond to the invalidated state. When the memory reaches this state the card is useless. This memory state is represented symbolically in FIG. 2 by each memory cell showing a zero. Accordingly, the value card has a one in each memory cell when handed over to the user in the loaded state.

FIGS. 3a to 3d show the four phases during a transaction with reference to an example.

In Phase 1 (FIG. 3a) the content of memory 2 is transferred to counter 3. Only when this process is concluded can the counter be operated. In the logic seleced in this embodiment, the counter is designed in such a way that the counter reading can only be decremented by corresponding clock pulses. Thus, the counter reading transferred to the counter from the memory can always only be reduced.

During Phase 2 (FIG. 3b) the counter reading is continuously decremented by the clock pulses generated by a telephone, for example. The figure shows in this phase the state of the counter after five clock pulses. Let us assume that an external or a circuit-internal control is designed in such a way that the memory is updated with the current counter reading after five clock pulses in each case. Using a memory made in $E^2PROM$ technology, it is necessary to erase this first. FIG. 3c shows the erased state of the memory obtained in Phase 3. Finally, in Phase 4 (FIG. 3d) the current counter reading is transferred to the memory by a writing process.

As already indicated by the sequence shown in the figures, security precautions must be taken to prevent the counter reading existing in memory 2 from being changed in favor of the user by fraudulent measures. For this purpose a control and security logic is provided on the circuit, which shall be described in detail below.

A first essential function for protecting the circuit from manipulation is that the circuit is only ready-to-operate for a transaction when the counter reading last stored non-volatilely in memory 2 has been transferred to counter 3 as the new initial value.

FIG. 4 shows an exemplary embodiment of a circuit which is part of control and security logic 4 and performs and aforesaid function.

The circuit shown in FIG. 4 consists essentially of a monoflop 14 with a Schmitt-trigger input, a flipflop 15 and gates 11, 12, 13 for blocking input lines $\phi$, C1 and C2.

Upon application of supply voltage Vcc, monoflop 14 with the Schmitt-trigger input generates a predefined pulse. For this purpose the Schmitt-trigger input is connected with the supply voltage via a delay circuit 17 (RC element). The pulse generated by the monoflop leads to set input S of flipflop 15, so that the latter is switched to a predefined state regardless of what signal is conducted by reset line R leading to clock input T of the flipflop. The inverting output of the flipflop, which has the state of logic 0 in the selected logic, is connected with AND gates 11, 12, 13 so that they block input lines $\phi$, C1 and C2 in this phase.

The pulse generated automatically by monoflop 14 upon application of the supply voltage can also be used to switch any other circuit elements to predefined initial states.

A reset pulse is now required to make the circuit operable. This pulse is utilized as a loading pulse for counter 3, on the one hand, and simultaneously or with a delay as a reset pulse for flipflop 15, on the other hand. With the loading pulse the content of memory 2 is transferred to counter 3. For this purpose the counter is equipped with so-called set inputs to which the information of memory 2 is applied. With the reset pulse, which leads to the clock input of flipflop 15, the inverting output of flipflop 15 is set to logic 1, thereby enabling the clock input and the control lines.

The circuit explained thus ensures that the circuit only be operated when the last memory content (residual value) has been transferred to the counter as the initial value for the following transaction.

As mentioned, a second function of the circuit relevant in terms of security is that the counter solely counts in one predefined direction. A binary counter constructed, for example, of a plurality of flipflops makes available at its non-inverting outputs, in the usual configuration, a binary number which is increased by one at every clock pulse, and accordingly at its inverting outputs a binary number which is reduced by one at each clock pulse.

By hard-wired decoding of the desired counter outputs, the necessary function can be realized in a simple manner.

Finally, a third function of the control and logic circuit relevant in terms of security is that the so-called overflow of the counter is detected and the circuit blocked in case of an overflow or before an overflow.

In the example explained with reference to FIGS. 3a to 3d, counter 3 reaches the maximum reading (overflow =decimal 15) when a further clock pulse is fed to the counter to the memory the card would be loaded with the initial value again. The possibility of manipulation resulting from overflow of the counter must thus be ruled out.

As shown by FIG. 5, a simple decoding logic can be used for this purpose, which always generates a signal when all flipflops of the counter have reached the zero condition. All outputs 9 of flipflops 8 of counter 3 are routed to an OR gate 10 which only generates a logic 0 level at its output when all inputs show a logic 0 level. In this state AND gates 11, 12 and 13, which may be identical to gates 11, 12 and 13 described in connection with FIG. 4, are blocked so that no further clock pulses reach counter 3. Therefore, only the counter reading "zero" can be transferred to the memory. This corresponds to the invalidated state, as assumed at the outset.

The explanations of the measures necessary in terms of security show that the inventive solution does not involve any disadvantages in this respect compared to known data carriers, on the one hand, and that relatively little effort for logic circuits is required to realize the necessary measures technically.

The drastic reduction in the memory requried and thus in the area of the integrated circuit achieved by the inventive solution is therefore barely diminished by the additional effort for security logic.

As already mentioned, a so-called expire card is set at an initial value before being issued to the user. It is possible to assign a certain initial value to a card by writing the binary combination corresponding to this value into the memory. However, it is also possible to load all memory cells universally by a writing process, for example immediately after production of the circuit, so that the card first has the maximum initial value possible. In this case the particular institution issuing the cards will reduce the memory to the desired initial value using the method described with reference to FIGS. 3a to 3d.

One must of course ensure that only authorized institutions are in a position to load the memory to the initial value. Depending on the conception of the card, this process can be performed either once or repeatedly.

I claim:

1. A data carrier arrangement for obtaining services, goods, or the like and having an integrated circuit (1); the integrated circuit having at least one non-volatile data memory (2) with a predetermined number of memory cells which are readable, erasable and writable; the integrated circuit (1) having along with the data memory (2) a counter (3) comprising a plurality of stages, and a control and security logic (4); the counter (3) being operable only in one predetermined direction; the size of the data memory (2) being selected such that its memory cells are adapted to the stages of the counter (3); and the control and security logic (4) controlling, among other things, the data transfer between the memory (2) and the counter (3) in such a way that, before each use of the data carrier, the current memory value is transferred to the counter and, after the use of the data carrier, the memory content is updated with the new counter reading.

2. A data carrier arrangement according to claim 1, characterized in that the non-volatile memory (2) is an electrically erasable and writable memory of the E²-PROM type.

3. A data carrier arrangement according to claim 1, characterized in that the counter (3) is a binary counter with a set input.

4. A data carrier arrangement according to claim 1, characterized in that the control and security logic (4) has a circuit comprising a decoding logic (10) and at least one blocking gate (11) which blocks operation of the counter before an overflow.

5. A data carrier arrangement according to claim 1, characterized in that the control and security logic (4) has a circuit (14, 15) which after each application of a supply voltage generates a predefind pulse which blocks at least control lines ($\phi$, C1, C2) leading to the circuit.

6. A data carrier arrangement according to claim 5, characterized in that the circuit (14, 15) is designed in such a way that the block can be removed by a reset pulse, this pulse also serving as a loading pulse for the counter (3).

* * * * *